United States Patent
Milillo et al.

(10) Patent No.: US 6,643,671 B2
(45) Date of Patent: *Nov. 4, 2003

(54) SYSTEM AND METHOD FOR SYNCHRONIZING A DATA COPY USING AN ACCUMULATION REMOTE COPY TRIO CONSISTENCY GROUP

(75) Inventors: Michael S. Milillo, Louisville, CO (US); Christopher J. West, Boulder, CO (US); David G. Hostetter, Superior, CO (US); Robert P. Eskenberry, Broomfield, CO (US); Jennifer Johnson, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 54 days.

This patent is subject to a terminal disclaimer.

(21) Appl. No.: 09/939,150

(22) Filed: Aug. 27, 2001

(65) Prior Publication Data

US 2002/0133512 A1 Sep. 19, 2002

Related U.S. Application Data

(63) Continuation-in-part of application No. 09/805,503, filed on Mar. 14, 2001.

(51) Int. Cl.[7] ............................ G06F 17/30; G06F 12/00
(52) U.S. Cl. ...................... 707/204; 707/202; 707/203; 711/161; 711/162; 711/165
(58) Field of Search ........................... 707/200, 202–204; 711/161, 162, 165

(56) References Cited

U.S. PATENT DOCUMENTS

| | | | | |
|---|---|---|---|---|
| 5,684,984 A | * | 11/1997 | Jones et al. | |
| 5,742,792 A | * | 4/1998 | Yanai et al. | 711/162 |
| 5,835,953 A | * | 11/1998 | Ohran | 711/162 |
| 6,253,295 B1 | * | 6/2001 | Beal et al. | 711/162 |
| 6,411,943 B1 | * | 6/2002 | Crawford | |
| 6,446,176 B1 | * | 9/2002 | West et al. | 711/162 |
| 6,526,419 B1 | * | 2/2003 | Burton et al. | 707/204 |

* cited by examiner

Primary Examiner—Frantz Coby
Assistant Examiner—Hanh Thai
(74) Attorney, Agent, or Firm—Brooks & Kushman P.C.

(57) ABSTRACT

A system and method for synchronizing a data copy include in one embodiment first and second remote copy trios, each with source, target, and secondary volumes. Source volumes store initial data files, execute write commands to generate updated data files, and generate records of the write commands. Target volumes receive copies of the initial data files and the write command records, and transmit the copies of the initial data files and data indicated by the write command records to secondary volumes. Secondary volumes store the copies of the initial data files and the data indicated by the write command records, which are available for use in generating copies of the updated data files. The target volumes transmit to the secondary volumes in series relative to each other so that consistency is maintained at all times across the source volumes.

24 Claims, 3 Drawing Sheets

SYSTEM AND METHOD FOR SYNCHRONIZING A DATA COPY USING AN ACCUMULATION REMOTE COPY TRIO CONSISTENCY GROUP

CROSS-REFERENCE TO RELATED APPLICATION

This application is a continuation-in-part of U.S. application Ser. No. 09/805,503 filed Mar. 14, 2001.

TECHNICAL FIELD

The present invention relates generally to a system and method for synchronizing a remote data copy and, more particularly, to a system and method for efficient snapshot synchronization of a data copy using at least one accumulation remote copy trio consistency group including a source volume, accumulated write commands, an established peer-to-peer remote copy (PPRC) volume pair, and data consistency models.

BACKGROUND ART

With increasingly large amounts of data being handled in data processing systems, storage systems, such as disk or tape storage systems, are being used to store data. Some organizations rely heavily on data and quick access to the data. Disasters caused by environmental conditions, user errors, or application errors may occur in which access to the data is lost for some period of time. Mirroring or copying data to a secondary storage system from a primary storage system is currently employed for recovery purposes to minimize the time in which access to data is lost due to such a disaster.

In that regard, peer-to-peer remote copy (PPRC) is a synchronous copy mechanism that creates a copy of data at a remote or secondary storage system. The copy at the secondary storage is kept current with the data located at the primary storage system. In other words, a copy of the data located at the secondary storage system is kept in synch with the data at the primary storage system as observed by the user of the data. Volume pairs are designated in which a volume in the primary storage system is paired with a volume in the secondary storage system. Data transfer occurs in pairs in which data is transferred from a volume in a primary storage system to a corresponding volume in a secondary storage system, which together may be referred to as an established PPRC pair.

With a PPRC system, a data copy made to the secondary, or "recovery," storage system occurs synchronously from a host point of view with write operations to volumes in the primary storage system. When data is written to the primary storage system, the data written to a particular volume is also written to a corresponding volume in the secondary storage system using a path to the secondary storage system.

Effecting a data copy from a primary volume to a secondary volume in a PPRC system may include an internal snapshot copying mechanism for copying all of the data of a source storage volume to a primary storage volume in a PPRC pair, which data is then migrated to the corresponding secondary storage volume. The internal snapshot copying mechanism makes a copy of at least one pointer to the data of a source volume, and the primary volume in the PPRC pair uses the pointers to access the data. The internal snapshot copying mechanism makes a copy of the data of a source volume to a primary volume of a PPRC pair by using pointers to the data in the source volume and then storing the pointers in a map. By using pointers, the internal snapshot mechanism can quickly copy the data from the source volume without affecting the access of a host to the source volume. The primary volume then transfers the data to the corresponding secondary volume without any host access interruption to the source volume.

There is, however, a large time difference between snapshot copies and synchronizing remote copies. That is, if a user wants to migrate a point-in-time copy of data from a source volume to a secondary volume in a PPRC pair by snapshot copying the source volume to the primary volume in the PPRC pair, the entire source volume is sent to the secondary volume, an operation which can take a very long time.

Further, as the number of PPRC volume pairs that are established and attempt to move from a duplex pending to a duplex state increases, system resources become increasingly degraded as duplex pending pairs are added. Cache space, processor cycles, and data paths are consumed while duplex pending. A duplex pending pair is a pair of corresponding volume pairs in which the system is attempting to copy the primary storage volume to the secondary storage volume. A duplex state pair is a pair of corresponding volume pairs in which the data from the primary storage volume has been copied to the secondary storage volume. Moreover, individual primary volume performance may be additionally affected because the host has to compete with the synchronizing task for access to the source volume. The synchronizing task is the process of migrating the source storage volume to the secondary storage volume.

Thus, there is needed an improved system and method for synchronizing a data copy. In such a system and method, when a user wants to snapshot copy from a simplex source volume to a PPRC volume pair in order to migrate backup data to a secondary system, rather than sending the entire source volume to the secondary volume, only data indicated by accumulated write commands would be sent. In order to make the snapshot copying and the migration of the data efficient, a bitmap would be used to signify the accumulated write commands. Advantageously, only the data indicated by those write commands would be snapshot copied and migrated to the secondary.

Such a system and method would preferably employ a group of three storage volumes in this operation. The first would be the source volume of the snapshot copy, which would accumulate the write commands in a bitmap. The next would be the target volume of the snapshot copy, which would be a primary volume of a PPRC pair and would receive the results of the write commands and a copy of the bitmap having the accumulated write commands. The final volume would be on the secondary system and would be the secondary volume of the PPRC pair. The three volumes would together comprise an accumulation remote copy trio. The source volume could be specified along with the establishment of the primary target-secondary PPRC pair, or configured through an operations panel. Upon establishment of the PPRC pair, an internal snapshot copy would synchronize the source and primary target volumes. The primary target volume would begin synchronization with the secondary volume by sending over the entire volume. The source volume would establish a bitmap and begin accumulating write commands received from a host. Subsequent snapshot copies from the source volume to the primary target volume would only snapshot copy data indicated by the accumulated write commands. Only that data indicated by the accumulated write commands would then be migrated to the secondary volume.

Such a system and method would thereby allow a user to make a point-in-time copy of data and very efficiently migrate that copy to a secondary system without impacting the source volume. The target of the snapshot copy would be the primary of a PPRC pair that would transfer only the tracks specified in the bitmap to the secondary volume. In such a fashion, the PPRC pair would become duplex much more efficiently because only the specified tracks in the bitmap would be sent to the secondary volume. The bitmap could represent granularity at a record, track or cylinder level. Such a system and method would thereby remove host impact to the source volume while data is being migrated to the secondary volume. As a result, very little response time degradation would be seen by the host. Still further, the more efficient migration of data to the secondary volume would reduce the time it takes to synchronize the volumes, consume less system resources, and reduce the time interval between potential snapshot copies for migration purposes.

Such a system and method could also be employed in storage systems that comprise multiple source volumes, each associated with an established PPRC pair. In that regard, users increasingly have databases that span multiple source volumes, and would like to migrate data to a secondary storage system also having multiple volumes for disaster recovery purposes as described above. Such migration should be as quick as possible to facilitate smaller incremental backups. In such systems, however, data consistency becomes more important. That is, for databases spanning multiple source volumes, users need multiple consistent secondary volumes. Thus, users are becoming more interested in creating consistency groups of several source volumes, and then making point-in-time copies of such groups for disaster recovery purposes.

While the above described system and method for synchronizing a data copy comprising at least one accumulation remote copy trio provide a mechanism for facilitating smaller incremental backups, there remains a need for consistency management using accumulation remote copy trios. Such a consistency group system and method would preferably support either "weak" or "strong" consistency models, as desired by a user. Such a system and method would also preferably allow a user to set up a particular consistency group by specifying a list of source volumes, as well as to select the type of consistency desired. Thereafter, such a system and method would automatically provide for and control the type of consistency selected by the user, without the need for user intervention or control of backup operations.

SUMMARY OF THE INVENTION

Accordingly, it is an object of the present invention to provide an improved system and method for synchronizing a data copy.

According to the present invention, then, a system is provided for synchronizing a data copy that comprises first and second remote copy trios. The first and second remote copy trios each comprise a source storage volume, a target storage volume associated with the source storage volume, and a secondary storage volume associated with the target storage volume. The source volume is provided for storing an initial data file, executing a plurality of write commands from a host to generate an updated data file, and generating a record of the write commands. The target volume is provided for receiving a copy of the initial data file and a copy of the write command record from the associated source volume, and transmitting the copy of the initial data file and data indicated by the write command record to the associated secondary volume. The secondary volume is provided for storing the copy of the initial data file and the data indicated by the write command record received from the associated target volume, wherein the copy of the initial data file and the data indicated by write command record stored on the secondary volume are available for use in generating a copy of the updated data file. According to one embodiment of the system of the present invention, the target volumes transmit to the associated secondary volumes in series relative to each other so that consistency is maintained at all times across the source volumes. According to another embodiment of system of the present invention, the target volumes transmit to the associated secondary volumes in parallel relative to each other so that consistency across the source volumes is achieved when all target volumes have completed transmitting to the associated secondary volumes.

Still further according to the present invention, a method is also provided for synchronizing a data copy. The method comprises providing first and second remote copy trios, each comprising a source storage volume, a target storage volume associated with the source storage volume, and a secondary storage volume associated with the target storage volume. The source volume is provided for storing an initial data file, executing a plurality of write commands from a host to generate an updated data file, and generating a record of the write commands. The target volume is provided for receiving a copy of the initial data file and a copy of the write command record from the associated source volume, and transmitting the copy of the initial data file and data indicated by the write command record to the associated secondary volume. The secondary volume is provided for storing the copy of the initial data file and the data indicated by the write command record received from the associated target volume, wherein the copy of the initial data file and the data indicated by write command record stored on the secondary volume are available for use in generating a copy of the updated data file. According to one embodiment of the method of the present invention, the target volumes transmit to the associated secondary volumes in series relative to each other so that consistency is maintained at all times across the source volumes. According to another embodiment of the method of the present invention, the target volumes transmit to the associated secondary volumes in parallel relative to each other so that consistency across the source volumes is achieved when all target volumes have completed transmitting to the associated secondary volumes.

According to the present invention, a system is also provided for synchronizing a data copy, the system comprising a source storage volume for storing an initial data file, executing a write command from a host to generate an updated data file, and generating a record of the write command. The system also comprises a target storage volume for receiving a copy of the initial data file and a copy of the write command record from the source volume, and a secondary volume for storing a copy of the initial data file. The target volume is further for transmitting the copy of the initial data file to the secondary volume, and transmitting data indicated by the write command record to the secondary volume so that consistency is maintained at all times for the source volume. The secondary volume is further for receiving and storing the data indicated by the write command record, wherein the copy of the initial data file and the data indicated by write command record stored on the secondary volume are available for use in generating a copy of the updated data file.

Still further according to the present invention, a method is also provided comprising providing a source storage volume for storing an initial data file, executing a write command from a host to generate an updated data file, and generating a record of the write command. The method further comprises providing a target storage volume for receiving a copy of the initial data file and a copy of the write command record from the source volume, and providing a secondary volume for storing a copy of the initial data file. The target volume is further for transmitting the copy of the initial data file to the secondary volume, and transmitting data indicated by the write command record to the secondary volume so that consistency is maintained at all times for the source volume, and the secondary volume is further for receiving and storing the data indicated by the write command record, wherein the copy of the initial data file and the data indicated by write command record stored on the secondary volume are available for use in generating a copy of the updated data file.

These and other features and advantages of the present invention are readily apparent from the following detailed description of the present invention when taken in connection with the accompanying drawings.

BEST MODES FOR CARRYING OUT THE INVENTION

With reference to FIGS. 1–5, the preferred embodiment of the method and system of the present invention will now be described in greater detail. As previously noted, it is common to copy data from a primary storage system to a secondary storage system for recovery purposes in the event of a disaster. In that regard, peer-to-peer remote copy (PPRC) is a synchronous copy mechanism that creates a copy of data at a remote or secondary storage system. In a PPRC system, volume pairs are designated in which a storage volume in the primary system is paired with a storage volume in the secondary system, which together may be referred to as an established PPRC volume pair. A data copy made to the secondary system occurs synchronously from a host point of view with write operations to volumes in the primary system. When data is written to the primary storage system, the data written to a particular volume is also written to a corresponding volume in the secondary storage system using a path to the secondary storage system.

Figure 1:
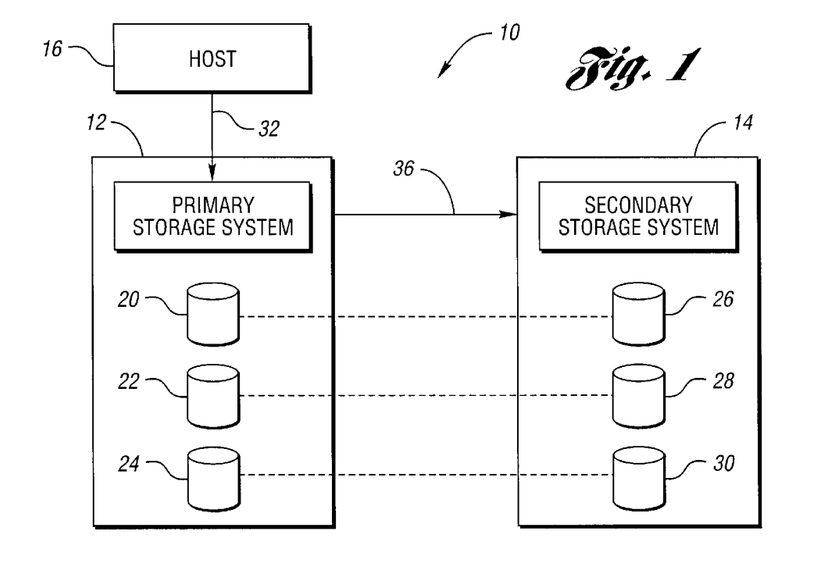
FIG. 1 illustrates a simplified block diagram of a peer-to-peer remote copy (PPRC) system according to the prior art.

Referring now to FIG. 1, a block diagram of a peer-to-peer remote copy (PPRC) system according to the prior art is shown, denoted generally by reference numeral 10. As seen therein, PPRC system 10 includes a primary storage system 12 and a secondary storage system 14. PPRC system further includes a host 16 connected to primary storage system 12. Host 16 stores data in primary storage system 12. Data written to primary storage system 12 is copied to secondary storage system 14. The copy process creates a copy of the data from primary storage system 12 into secondary storage system 14. The copy process is a PPRC mechanism. In PPRC system 10, a write made by host 16 is considered complete only after the data written to primary storage system 12 also is written to secondary storage system 14. Host 16 may take various forms, such as a server on a network, a Web server on the Internet, or a mainframe computer. Primary storage system 12 and secondary storage system 14 are disk systems in these examples, although tape or other storage systems known in the art may also be used.

A communication path 32 connects host 16 to primary storage system 12. A communication path 36 connects primary storage system 12 with secondary storage system 14. Communication paths 32 and 36 may take various forms, such as, for example, a local area network (LAN), a wide area network (WAN), the Internet, or an intranet. Communication paths 32 and 36 contain various links, such as, for example, fiber optic lines, packet switched communication links, enterprise systems connection (ESCON) fibers, small computer system interface (SCSI) cable, and wireless communication links.

PPRC system 10 is intended as an example of a data processing system and not as an architectural limitation to the present invention. For example, host 16 and primary storage system 12 may be connected directly, while primary storage system 12 and secondary storage system 14 may be connected by a LAN or a WAN. Further, primary storage system 12 and secondary storage system 14 may be connected to each other by a network rather than a direct connection.

Primary storage system 12 includes a set of storage volumes 20, 22, and 24. Secondary storage system 14 includes a set of storage volumes 26, 28, and 30. Secondary storage volumes 26, 28, and 30 correspond to primary storage volumes 20, 22, and 24. The correspondence between the volumes in primary and secondary storage systems 12 and 14 is set up in PPRC pairs, such that a storage volume in primary storage system 12 has a corresponding storage volume in secondary storage system 14. For instance, primary volume 20 is paired with secondary volume 26, primary volume 22 is paired with secondary volume 28, and primary volume 24 is paired with secondary volume 30. These pairs are referred to as established PPRC pairs.

In operation, primary storage system 12 sends data over communication path 36 to secondary storage system 14 each time data is written to a primary storage volume by host 16. Secondary storage system 14 then copies the data to the secondary storage volume corresponding to the primary storage volume. For example, if data is written to primary storage volume 20 then the data is copied to the corresponding secondary storage volume 26. Similarly, if data is written to primary storage volume 22 then the data is copied to the corresponding secondary storage volume 28. It should be noted that, as used herein, the term volume is intended to include any desired or necessary means for processing data on the volume. This could include, but would not be limited to or require, instruction memory, data memory, processors, data buffers, or any other associated devices or software.

Figure 2:
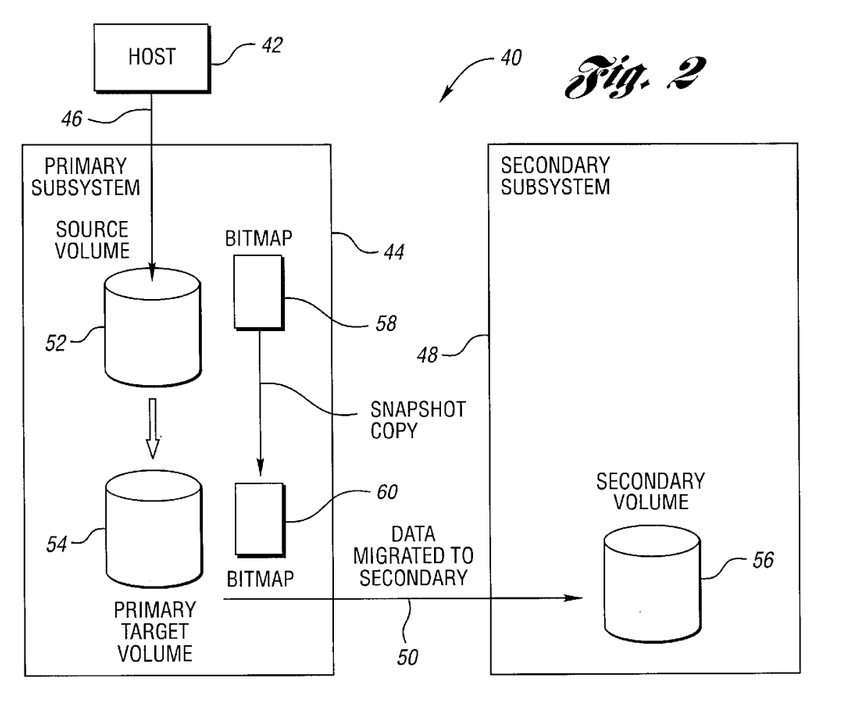
FIG. 2 illustrates a simplified block diagram of an accumulation remote copy trio architecture according to the present invention, including a source volume, target volume, and secondary volume.

Referring next to FIG. 2, a block diagram of the preferred accumulation remote copy trio architecture according to the present invention is shown, denoted generally by reference numeral 40. As seen therein, a host 42 is provided in communication with primary storage subsystem 44 via communication path 46. Primary storage subsystem 44 is also provided in communication with a secondary storage subsystem 48 via communication path 50. Primary storage subsystem 44 includes a source storage volume 52, which is provided in communication with a primary target storage volume 54. Secondary storage subsystem 48 includes a secondary storage volume 56, which together with primary target storage volume 54 comprise an established PPRC volume pair as previously described. Source volume 52, primary target volume 54, and secondary volume 56 together comprise the preferred accumulation remote copy trio. It should be noted that FIG. 2 depicts a single PPRC volume pair (primary target volume 54 and secondary volume 56) and a single source volume 52 for the sake of simplicity only. As those of ordinary skill will appreciate, additional PPRC volume pairs and source volumes may also be included. Primary storage subsystem 44 and secondary storage subsystem 48 are disk systems in these examples, although tape or other storage systems known in the art may also be used.

Once again, communication paths 46 and 50 may take various forms, such as, for example, a local area network (LAN), a wide area network (WAN), the Internet, or an intranet. Communication paths 46 and 50 contain various links, such as, for example, fiber optic lines, packet switched communication links, enterprise systems connection (ESCON) fibers, small computer system interface (SCSI) cable, and wireless communication links. Moreover, as noted above, the architecture 40 depicted in FIG. 2 is intended as an example of a system in which the present invention may be implemented and not as an architectural limitation to the present invention. For example, host 42 and primary storage system 44 may be connected directly, while primary storage system 44 and secondary storage system 48 may be connected by a LAN or a WAN. Further, primary storage system 44 and secondary storage system 48 may be connected to each other by a network rather than a direct connection.

As noted above, according to the prior art, making a data copy from source volume 52 to secondary volume 56 in a PPRC system may be accomplished by an internal snapshot copying mechanism for copying all of the data of source volume 52 to primary target volume 54, which data is then migrated to corresponding secondary volume 56. The internal snapshot copying mechanism makes a copy of a pointer to the data of source volume 52, and the primary target volume 54 in the PPRC pair uses the pointers to access the data. The internal snapshot copying mechanism makes a copy of the data of source volume 52 to primary target volume 54 of the PPRC pair by using pointers to the data in the source volume 52 and then storing the pointers in a map (not shown). By using pointers, the internal snapshot mechanism can quickly copy the data from the source volume 52 without affecting the access of host 42 to the source volume 52. The primary target volume 54 then transfers the data to the corresponding secondary volume 56 via communication path 50 without any interruption of access by host 42 to source volume 52.

As previously noted, however, there is a large time difference between snapshot copies and synchronizing remote copies. That is, if a user wants to migrate a point-in-time copy of data from source volume 52 to secondary volume 56 in the PPRC pair by snapshot copying the source volume 52 to the primary target volume 54 in the PPRC pair according to the prior art, the entire source volume 52 is sent to the secondary volume 56, an operation which can take a very long time. Further, as also previously noted, as the number of PPRC volume pairs that are established and attempt to move from a duplex pending to a duplex state increases, system resources become increasingly degraded as duplex pending pairs are added. Moreover, individual primary target volume 54 performance may be additionally affected because host 42 has to compete with the synchronizing task for access to source volume 52.

The present invention provides an improved system and method for synchronizing a data copy which overcomes these problems. According to the present invention, when a user wants to snapshot copy from simplex source volume 52 to PPRC volume pair 54, 56 in order to migrate backup data to secondary subsystem 48, rather than sending the entire source volume 52 to the secondary volume 56, only accumulated write commands received by source volume 52 from host 42 are sent. Source volume 52 could be specified along with the establishment of the primary target-secondary PPRC pair 54, 56. Alternatively, source volume 52 could be configured through an operations panel. Upon establishment of the PPRC pair 54, 56, an internal snapshot copy is used to synchronize the source 52 and primary target 54 volumes. The primary target volume 54 begins synchronization with the secondary volume 56 by sending over the entire volume.

Still referring to FIG. 2, source volume 52 has an initial data file (not shown) stored thereon. In that regard, a single data file is discussed herein for the sake of simplicity only. As is well known to those of ordinary skill in the art, source volume 52 may comprise any number of data files. Source volume 52 receives a series of write commands from host 42 via communication path 46, which source volume 52 may execute in order to generate an updated data file (not shown). In order to make the snapshot copying and the migration of the data efficient, source volume 52 generates a record of the series of write commands received from host 42, preferably by establishing a bitmap 58 which is used to signify the accumulated write commands.

As a result of the initial snapshot copy operation described above, both primary target volume 54 and secondary volume 56 have stored thereon a copy of the data file stored on source volume 52. Subsequent snapshot copies from source volume 52 to primary target volume 54 snapshot copy only the write command record. In that regard, a copy 60 of bitmap 58 having the accumulated write commands is received by primary target volume 54 from source volume 52. Bitmap 58 is then reset at the source volume in order to identify the next set of accumulated write commands. Primary target volume 54 also receives from source volume 52 the data of the write commands from host 42. Only the data indicated by the accumulated write commands, however, is then migrated to secondary volume 56 from primary target volume 54. That is, secondary volume 56 receives and stores the data indicated by the copy 60 of the write command record. For example, bitmap copy 60 of the write command record may indicate which cylinders of source volume 52 contain modified tracks. In that event, only the data from the cylinders so indicated is transmitted to the secondary volume 56 from primary target volume 54. The copy of the data file (not shown) and the data indicated by the copy of the write command record 60 may be used by the secondary volume 56 in a data recovery operation to generate a copy of the updated data file stored on source volume 52 in the event of a disaster. Once again, as used herein, the term volume is intended to include any desired or necessary means for processing data on the volume. This could include, but would not be limited to or require, instruction memory, data memory, processors, data buffers, or any other associated devices or software.

The present invention thereby allows a user to make a point-in-time copy of data and very efficiently migrate that copy to a secondary system 48 without impacting the source volume 52. In that regard, the target volume 54 of the snapshot copy is the primary of a PPRC volume pair that transfers only the records, tracks or cylinders specified in the bitmap 58, 60 to the secondary volume 56. In such a fashion, the PPRC pair 54, 56 become duplex much more efficiently because only the specified records, tracks or cylinders in the bitmap 58, 60 are sent to the secondary volume 56. The present invention thereby removes host 42 impact to the source volume 52 while data is being migrated to the secondary volume 56. As a result, very little response time degradation is seen by host 42. Still further, the more efficient migration of data to secondary volume 56 reduces the time it takes to synchronize the volumes 52, 56, consumes less system resources, and reduces the time interval between potential snapshot copies for migration purposes.

As previously noted, the system described above in connection with FIG. 2 may include multiple source volumes, each associated with an established PPRC pair. In that regard, users increasingly have databases that span multiple source volumes, and would like to migrate data to a secondary storage system also having multiple volumes for disaster recovery purposes, as previously described. Such migration should be as quick as possible to facilitate smaller incremental backups. In such a system, however, data consistency becomes more important. That is, for databases spanning multiple source volumes, users need multiple consistent secondary volumes. While the system described above in connection with FIG. 2 provides a mechanism for facilitating smaller incremental backups, there remains a need for consistency management using accumulation remote copy trios. Such a consistency group system and method would preferably support either "weak" or "strong" consistency models, as selected by a user, and would also preferably allow the user to set up the particular consistency group desired by specifying a list of source volumes. Thereafter, such a system and method would automatically control and provide for the type of consistency selected by the user, without the need for user intervention or control of snapshot copying procedures.

Figure 3:
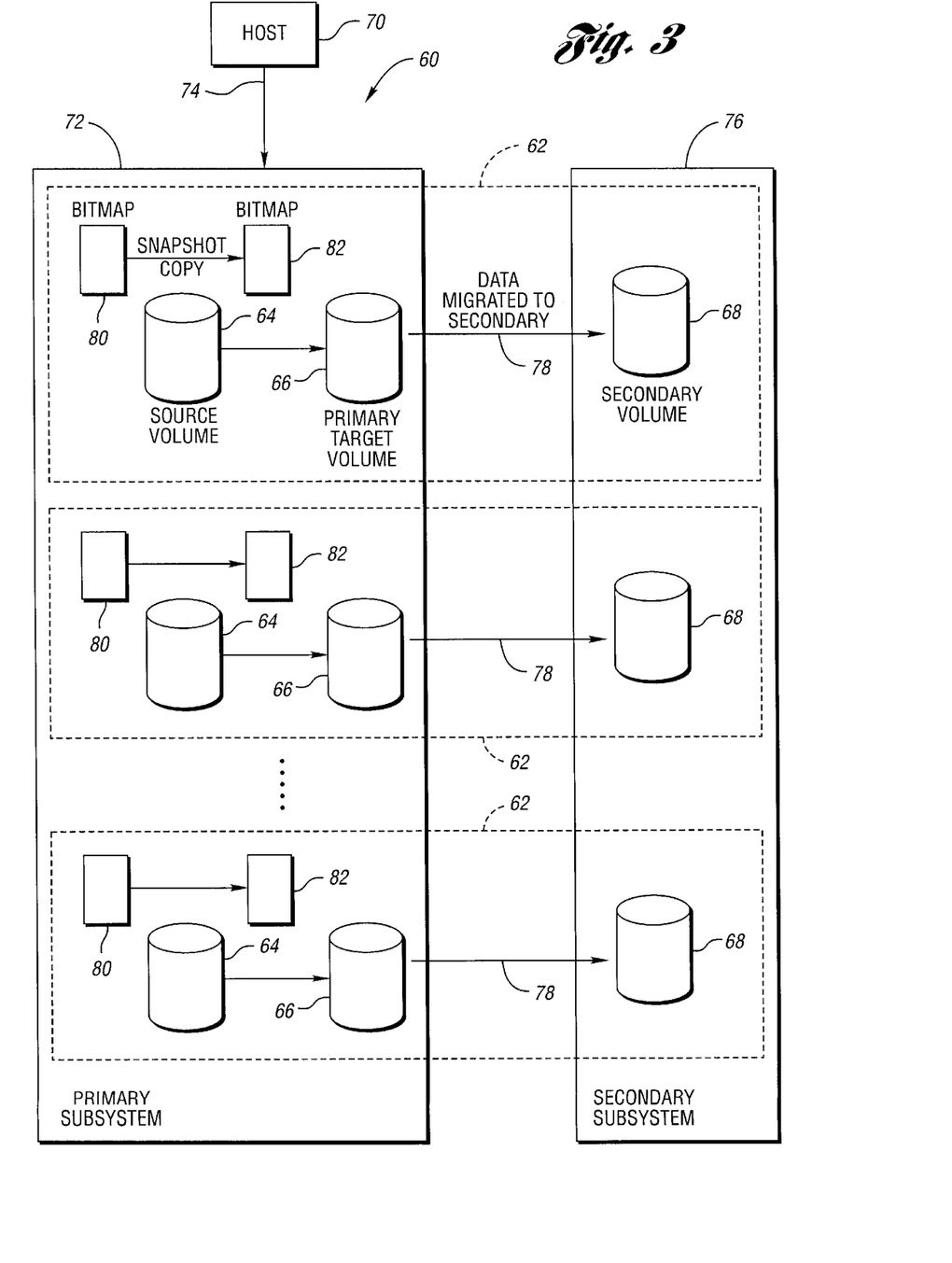
FIG. 3 illustrates a simplified block diagram of an accumulation remote copy trio consistency group architecture according to one embodiment of the present invention.

Referring next to FIG. 3, a simplified block diagram of an accumulation remote copy trio consistency group architecture according to one embodiment of the present invention is shown, denoted generally by reference numeral 60. As seen therein, the system 60 includes multiple accumulation remote copy trios 62, each including associated source, target, and secondary volumes 64, 66, 68. As seen therein, a host 70 is provided in communication with primary storage subsystem 72 via communication path 74. Primary storage subsystem 72 is also provided in communication with a secondary storage subsystem 76 via communication paths 78. Primary storage subsystem 72 includes source volumes 64, each of which is provided in communication with an associated primary target volume 66. Secondary storage subsystem 76 includes secondary volumes 68. Each secondary volume 68, together with its associated primary target volume 66, comprises an established PPRC volume pair as previously described.

Once again, primary and secondary storage subsystem 72, 76 are disk systems in these examples, although tape or other storage systems known in the art may also be used. Similarly, communication paths 74 and 78 may take various forms, such as, for example, a local area network (LAN), a wide area network (WAN), the Internet, or an intranet, and may contain various links, such as, for example, fiber optic lines, packet switched communication links, enterprise systems connection (ESCON) fibers, small computer system interface (SCSI) cable, and wireless communication links. Moreover, the architecture 60 depicted in FIG. 3 is again intended as an example of a system in which the present invention may be implemented and not as an architectural limitation to the present invention. For example, host 70 and primary storage system 72 may be connected directly, while primary and secondary storage systems 72, 76 may be connected by a LAN or a WAN. Further, primary and secondary storage systems 72, 76 may be connected to each other by a network rather than a direct connection.

With respect to snapshot copy operations, the system 60 shown in FIG. 3 functions in the same fashion to provide the same advantages as the system described above in connection with FIG. 2, but here involving multiple accumulation remote copy trios 62 rather than a single accumulation remote copy trio. Thus, when a user wants to snapshot copy from simplex source volumes 64 to PPRC volume pairs 66, 68 in order to migrate backup data to secondary subsystem 76, only accumulated write commands received by source volumes 64 from host 70 are sent. Primary target volumes 66 begin synchronization with the associated secondary volumes 68 by sending over the entire volume. Source volumes 64 have initial data files (not shown) stored thereon, and execute write commands received from host 70 via communication path 74 in order to generate updated data files (not shown). In order to make the snapshot copying and the migration of the data efficient, each source volume 64 generates a record of the write commands received from host 70, preferably by establishing a bitmap 80 which is used to signify the accumulated write commands.

As a result of the initial snapshot copy operation, primary target and secondary volumes 66, 68 have stored thereon copies of the initial data files (not shown) stored on source volumes 64. Subsequent snapshot copies from source volumes 64 to primary target volumes 66 snapshot copy only the write command records. Copies 82 of bitmaps 80 having the accumulated write commands are received by primary target volumes 66 from source volumes 64. Only the data indicated by the accumulated write commands, however, is then migrated to secondary volumes 68 from primary target volumes 66. That is, secondary volumes 68 receive and store the data indicated by the copies 82 of the write command records. The copies of the data files (not shown) and the data indicated by the copies of the write command record 82 may be used by the secondary volumes 68 in a data recovery operation to generate copies of the updated data files (not shown) stored on source volume 64. Once again, as used herein, the term volume is intended to include any desired or necessary means for processing data on the volume. This could include, but would not be limited to or require, instruction memory, data memory, processors, data buffers, or any other associated devices or software.

The system depicted in FIG. 3, however, also provides for consistency management. More particularly, as an example, in an organization having an employee database spanning multiple source volumes, one data file on one source volume may contain a record of an employee's salary, and another data file on another source volume may contain an employee profile, the profile including a pointer to the data file containing the record of the employee's salary. Typically, when the employee's salary changes, the new salary is input into another data file, and the pointer in the data file containing the employee profile is then changed to point to the data file containing the new salary. As is well known to those of ordinary skill in the art, in the context of backup operations, consistency is maintained across the source volumes where neither the salary nor the pointer data has yet been updated on the secondary volumes, or where both the salary and the pointer data have been updated on the secondary volumes. That is, in a disaster recovery event, the source volumes can be restored to a consistent state if both or neither of the pointer and the salary data have been updated on the secondary volumes. Still further, at the source volumes involved, inputting the new salary data occurs in sequence before changing the pointer data. As a result, volume consistency may be maintained where only the salary data has been updated on a secondary volume. Under those circumstances, such as may occur as a result of a failure during a backup operation, the source volume where salary data was updated can be restored to a consistent state. That is, while the relevant data across all source volumes has not been updated at all the secondary volumes, the updated data that is available has been updated at the secondary volumes in the same order it was updated at the source volumes.

Conversely, again in a disaster recovery event, particularly in the event of a failure during a backup operation, if only the pointer has been updated on the secondary volumes, then the restored source volumes will not be consistent, either as a group or by volume. That is, upon restoration of the source volumes, the pointer will indicate that the employee has a new salary, but the new salary data will not be present. It is this type of inconsistent state that the present invention allows the user to prevent, thereby providing what may be referred to as "strong" consistency. Alternatively, the present invention also allows the user to accept the possibility of such inconsistency in exchange for enhanced performance, thereby providing what may be referred to as "weak" consistency.

Thus, the present invention is designed to support both "weak" and "strong" consistency models. More particularly, a consistency group would contain multiple accumulation remote copy trios 62, such as depicted in FIG. 3. Set-up of a consistency group may be specified by a user through a list of source volumes 64, where each source volume is part of an accumulation remote copy trio 62. The user may also select the type of consistency model desired. Such actions may be undertaken by appropriate user commands. For example, a user might issue Begin Consistency and End Consistency commands, between which the user identifies multiple source volumes 64 in order to define a consistency group. A user might also issue a Type Consistency command whereby the user selects the type of consistency model desired. Upon receipt of the End Consistency command, in the fashion described in detail above, the target volumes 66 would receive snapshot copy data from the source volumes 64, and then migrate the data to the secondary volumes 68 according to the consistency model selected, without the need for any further user control or involvement.

More specifically, still referring to FIG. 3, in a "weak" consistency model, when a consistency group creation command is received, all source volumes 64 would stop accepting write commands and snapshot copy processing would commence. Once a snapshot of all the source volumes 64 in the group is completed, write commands would again be accepted, and the target volumes 66 would begin synchronizing the data to the secondary volumes 68. Since, for subsequent snapshots, the amount of data to be sent to the secondary volumes 68 is limited to that indicated by the accumulated write commands, the process is efficient. Transmissions from the target volumes 66 to the associated secondary volumes 68 take place concurrently, or in parallel, relative to each other. Consistency across all source volumes 64 occurs when the snapshot data has been completely copied to the associated secondary volumes 68 for all source volumes 64 in the consistency group. Consistency is thus provided when all volumes in an established PPRC pair attain duplex state. Such operation allows faster copying of data to the secondary subsystem 76, at the cost of "windows" of inconsistency. That is, as a result of the concurrent or parallel transmissions described above, small periods of time occur during a backup operation where, in the event of a failure, it may not be possible to restore source volumes 64 to a consistent state, depending upon the number and/or identity of the secondary volumes 68 that have been completely updated. Such "windows," however, are minimized because the accumulated write command feature of the present invention provides for small, incremental, fast backups. Such operation might be selected by a user having a relatively large number of source volumes, where enhanced performance may be of higher importance.

With continuing reference to FIG. 3, in a "strong" consistency model, as each snapshot is requested from a source volume 64 to a primary target volume 66, the snapshot copying is performed completely for each source volume 64 in the strict order in which the snapshots were requested by the host 70. With such serial transmissions from the target volumes 66 to the secondary volumes 68 relative to each other, the host 70 can ensure that the order of the updates to each source volume 64 in a consistency group is maintained as data is sent to the secondary volumes 68 using the more efficient accumulation bitmaps 80, 82. Consistency is always maintained at the performance cost of serializing the operation of the snapshot backups. Such operation might be selected by a user having a relatively small number of source volumes where enhanced performance is not as important.

It is also possible to provide for "strong" or "weak" consistency within any single accumulation remote copy trio, whether such a trio is stand-alone, such as is depicted in FIG. 2, or is part of a group of remote copy trios, such as is depicted in FIG. 3. In that regard, the operation described above for the single accumulation remote copy trio depicted in FIG. 2 represents a "weak" consistency model. Referring back to the employee profile example described above, however, both the salary and the pointer data may be stored on a single source volume. In that event, a user may desire "strong" consistency for that source volume. Such "strong" consistency could be provided through the control of write commands and snapshot copy operations within the volumes 52, 54, 56 comprising the remote copy trio. That is, after each write command is executed at source volume 52, such as a write command to update the employee's salary data, a snapshot copy operation would then be performed in the fashion described above in order to update the salary data at secondary volume 56 before execution of any further write commands at source volume 52, such as a write command to update the employee profile pointer data. Thus, in the above example, after a write command is executed at source volume 52 to update the employee profile pointer data, a snapshot copy operation would again be performed in the fashion described above in order to update the pointer data at the secondary volume 56. Performing a snapshot copy operation after each write command would maintain consistency for the source volume 52 at all times.

More specifically, such a system for synchronizing a data copy comprises source volume 52 for storing an initial data file (not shown), and executing a write command from host 42 to generate an updated data file (not shown). Source volume 42 generates a record of the write command, such as bitmap 58. Target volume 54 receives a copy of the initial data file (not shown) and a copy of the write command record, such as bitmap 60, from source volume 54. Secondary volume 56 has stored thereon, by virtue of the initial snapshot operation, a copy of the initial data file (not shown) transmitted from target volume 54. Target volume 54 also transmits the data (not shown) indicated by bitmap write command record 54 to secondary volume 56. By performing such a snapshot copy operation after each write command, consistency is maintained at all times for source volume 52. Secondary volume 56 receives and stores the data (not shown) indicated by bitmap write command record 54, and the copy of the initial data file (not shown) and the data (not shown) indicated by bitmap write command record 54 stored on secondary volume 56 are available for use in generating a copy of the updated data file (not shown).

Figure 4:
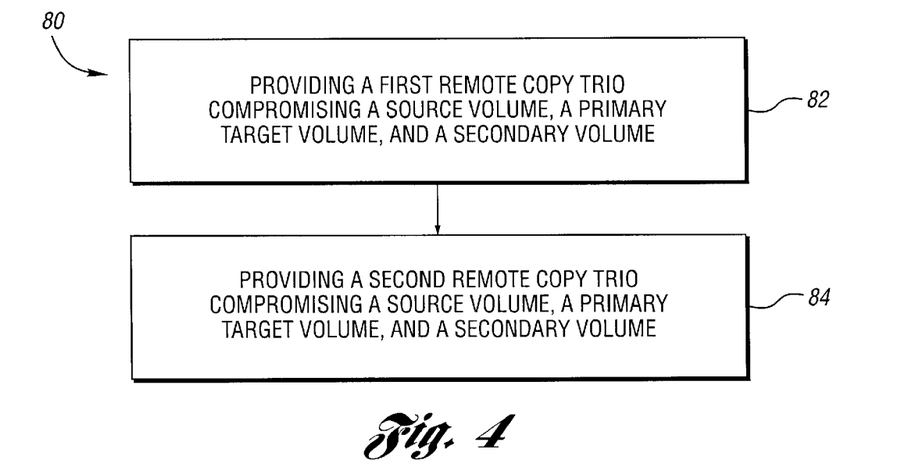
FIG. 4 illustrates a simplified, representative flow chart of a method for synchronizing a data copy according to one embodiment of the present invention, the method involving an exemplary accumulation remote copy trio consistency group architecture.

Referring now to FIG. 4, a simplified, representative flow chart of a method for synchronizing a data copy according to one embodiment of the present invention is shown, denoted generally by reference numeral 80, the method 80 involving an exemplary accumulation remote copy trio consistency group architecture. As seen therein, the method 80 comprises providing 82 a first remote copy trio, and providing 84 a second remote copy trio, the first and second trios each comprising a source storage volume, a target storage volume associated with the source storage volume, and a secondary storage volume associated with the target storage volume.

As described in detail above, the source volume is for storing an initial data file, executing a plurality of write commands from a host to generate an updated data file, and generating a record of the write commands. As also described in detail above, the target volume is for receiving a copy of the initial data file and a copy of the write command record from the associated source volume, and transmitting the copy of the initial data file and data indicated by the write command record to the associated secondary volume. The secondary volume, as again described in detail above, is for storing the copy of the initial data file and the data indicated by the write command record received from the associated target volume, wherein the copy of the initial data file and the data indicated by the write command record stored on the secondary volume are available for use in generating a copy of the updated data file. As again described previously in detail, the target volumes may transmit to the associated secondary volumes in series relative to each other so that consistency is maintained at all times across the source volumes or, alternatively, the target volumes may transmit to the associated secondary volumes in parallel relative to each other so that consistency across the source volumes is achieved when all target volumes have completed transmitting to the associated secondary volumes. Once again, as used herein, the term volume is intended to include any desired or necessary means for processing data on the volume. This could include, but would not be limited to or require, instruction memory, data memory, processors, data buffers, or any other associated devices or software.

Figure 5:
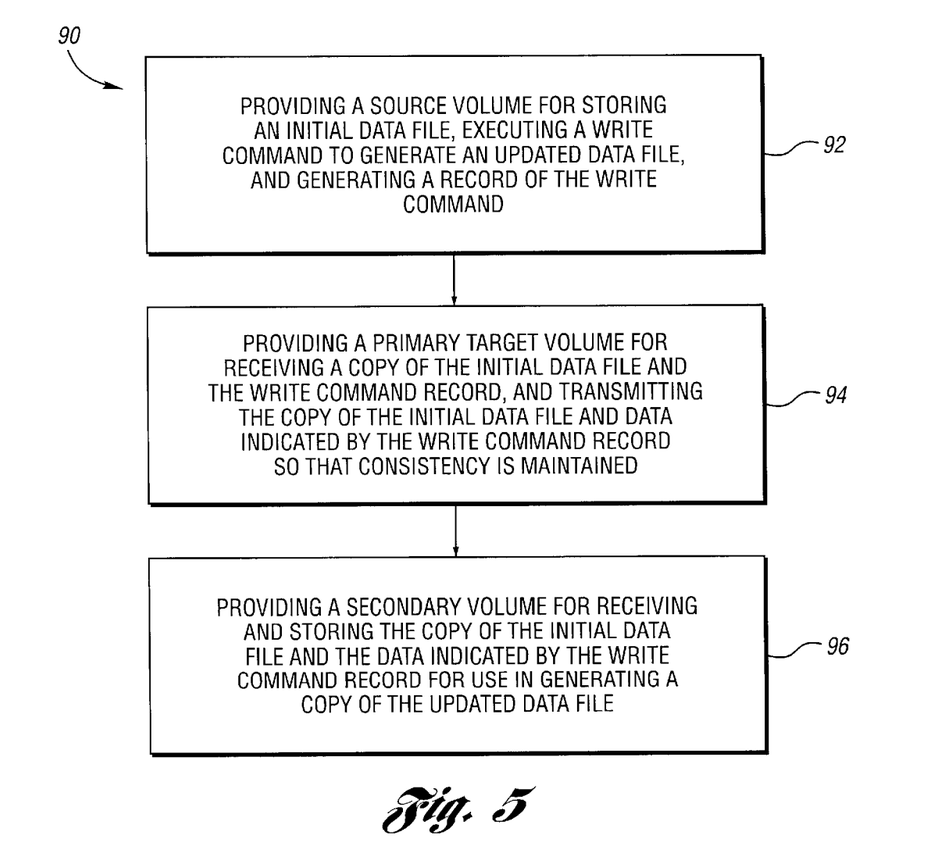
FIG. 5 illustrates a simplified, representative flow chart of a method for synchronizing a data copy according to another embodiment of the present invention, the method involving another exemplary accumulation remote copy trio consistency group architecture.

Referring next to FIG. 5, a simplified, representative flow chart of a method for synchronizing a data copy according to another embodiment of the present invention is shown, denoted generally by reference numeral 90, the method 90 involving another exemplary accumulation remote copy trio consistency group architecture. As seen therein, the method 90 comprises providing 92 a source storage volume for, as previously described in detail, storing an initial data file, executing a write command from a host to generate an updated data file, and generating a record of the write command. The method further comprises providing 94 a target storage volume for, as also previously described in detail, receiving a copy of the initial data file and a copy of the write command record from the source volume. The method still further comprises providing 96 a secondary volume for, as again described in detail above, storing a copy of the initial data file. As also described in detail above, the target volume is further for transmitting the copy of the initial data file to the secondary volume, and transmitting data indicated by the write command record to the secondary volume so that consistency is maintained at all times for the source volume, and the secondary volume is further for receiving and storing the data indicated by the write command record, wherein the copy of the initial data file and the data indicated by write command record stored on the secondary volume are available for use in generating a copy of the updated data file. Once again, as used herein, the term volume is intended to include any desired or necessary means for processing data on the volume. This could include, but would not be limited to or require, instruction memory, data memory, processors, data buffers, or any other associated devices or software.

It should be noted that the simplified flowcharts depicted in FIGS. 4 and 5 are but exemplary embodiments of the method of the present invention. In that regard, the steps of such methods may be executed in sequences other than those shown in FIGS. 4 and 5, including the execution of one or more steps simultaneously. Similarly, one or more of the steps illustrated in FIGS. 4 and 5 may be omitted without departing from the scope of the present invention. It should also be noted that the primary and secondary storage systems described herein, as well as the volumes thereof, may be any type of medium including, but not limited to, disk, tape, optical, holographic, or others.

As is readily apparent from the foregoing description, according to the present invention, when a user wants to snapshot copy from a simplex source volume to a PPRC volume pair in order to migrate backup data to a secondary system, rather than sending the entire source volume to the secondary volume, only data indicated by accumulated write commands is sent. In order to make the snapshot copying and the migration of the data efficient, a bitmap is used to signify the accumulated write commands (i.e., the write command record). Advantageously, only that data indicated by the write commands is migrated to the secondary. To do so, the present invention preferably employs at least one accumulation remote copy trio. The trio comprises a source storage volume which accumulates the write commands in a bitmap, a primary target storage volume which receives the bitmap having the accumulated write commands, and a secondary storage volume. Upon establishment of the primary target and the secondary as a PPRC volume pair, an internal snapshot copy synchronizes the source and the primary target volumes. The primary target volume begins synchronization with the secondary volume by sending over the entire volume. The source volume establishes a bitmap and begins accumulating write commands received from a host. Subsequent snapshot copies from the source volume to the primary target volume snapshot copy only the accumulated write commands, as indicated by the write command record. Only that data indicated by the accumulated write commands is then migrated to the secondary volume.

In such a fashion, the present invention allows a user to make a point-in-time copy of data and very efficiently migrate that copy to a secondary system without impacting the source volume. The target of the snapshot copy is the primary of a PPRC pair that transfers only the tracks, records or cylinders specified in the bitmap to the secondary volume.

The PPRC pair therefore becomes duplex much more efficiently because only the specified tracks, records or cylinders in the bitmap are sent to the secondary volume. The present invention thereby removes host impact to the source volume while data is being migrated to the secondary volume. As a result, very little response time degradation is seen by the host. Still further, the more efficient migration of data to the secondary volume reduces the time it takes to synchronize the volumes, consumes less system resources, and reduces the time interval between potential snapshot copies for migration purposes.

As is readily apparent from the foregoing description, the present invention still further provides for consistency management in accumulation remote copy trios for use in making smaller, incremental, point-in-time copies of data for disaster recovery purposes, particularly in systems comprising multiple source and secondary volumes. The present invention supports both "weak" and "strong" consistency models, as specified by a user, allowing the user to set up the particular type of consistency group desired by specifying a list of source volumes. The present invention still further then automatically controls and provides for the type of consistency selected by the user, without the need for user intervention or control of snapshot copying procedures.

Thus it is apparent that there has been provided, in accordance with the present invention, an improved system and method for synchronizing a remote data copy. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for snapshot synchronization of copies of data files from respective source storage volumes, configured in a simplex state, to established peer-to-peer remote copy (PPRC) volume pairs each associated with a respective source storage volume in order to migrate the data file copies from target storage volumes of the established PPRC volume pairs to secondary storage volumes of the established PPRC volume pairs, the system comprising:

a first remote copy trio; and a second remote copy trio, the first and second trios each comprising a source storage volume in a simplex state, a target storage volume associated with the source storage volume, and a secondary storage volume associated with the target storage volume, wherein associated target and secondary volumes together comprise an established PPRC volume pair, each source volume for storing an initial data file, executing a plurality of write commands from a host on the initial data file to generate an updated data file, and generating a record of the write commands, each target volume for receiving a snapshot copy of the initial data file and a snapshot copy of the write command record from the associated source volume, and transmitting the copy of the initial data file and data indicated by the write command record to the associated secondary volume, and each secondary volume for storing the copy of the initial data file and the data indicated by the write command record received from the associated target volume, wherein the copy of the initial data file and the data indicated by the write command record stored on the secondary volume are available for use by the secondary volume in generating a copy of the updated data file, and wherein the target volumes transmit to the associated secondary volumes in series relative to each other so that consistency is maintained at all times across the source volumes.

2. The system of claim 1 wherein the source, target, and secondary volumes each comprise a magnetic tape.

3. The system of claim 1 wherein the source, target, and secondary volumes each comprise a magnetic disk.

4. The system of claim 1 wherein the record of the plurality of write commands comprises a bitmap.

5. A system for snapshot synchronization of copies of data files from respective source storage volumes, configured in a simplex state, to established peer-to-peer remote copy (PPRC) volume pairs each associated with a respective source storage volume in order to migrate the data file copies from target storage volumes of the established PPRC volume pairs to secondary storage volumes of the established PPRC volume pairs, the system comprising:

a first remote copy trio; and a second remote copy trio, the first and second trios each comprising a source storage volume in a simplex state, a target storage volume associated with the source storage volume, and a secondary storage volume associated with the target storage volume, wherein associated target and secondary volumes together comprise an established PPRC volume pair, each source volume for storing an initial data file, executing a plurality of write commands from a host on the initial data file to generate an updated data file, and generating a record of the write commands, each target volume for receiving a snapshot copy of the initial data file and a snapshot copy of the write command record from the associated source volume, and transmitting the copy of the initial data file and data indicated by the write command record to the associated secondary volume, and each secondary volume for storing the copy of the initial data file and the data indicated by the write command record received from the associated target volume, wherein the copy of the initial data file and the data indicated by the write command record stored on the secondary volume are available for use by the secondary volume in generating a copy of the updated data file, and wherein the target volumes transmit to the associated secondary volumes in parallel relative to each other so that consistency across the source volumes is achieved when all target volumes have completed transmitting to the associated secondary volumes.

6. The system of claim 5 wherein the source, target, and secondary volumes each comprise a magnetic tape.

7. The system of claim 5 wherein the source, target, and secondary volumes each comprise a magnetic disk.

8. The system of claim 5 wherein the record of the plurality of write commands comprises a bitmap.

9. A method for snapshot synchronization of copies of data files from respective source storage volumes, configured in a simplex state, to established peer-to-peer remote copy (PPRC) volume pairs each associated with a respective source storage volume in order to migrate the data file copies from target storage volumes of the established PPRC volume pairs to secondary storage volumes of the established PPRC volume pairs, the method comprising:

providing a first remote copy trio; and providing a second remote copy trio, the first and second trios each comprising a source storage volume in a simplex state, a target storage volume associated with the source storage volume, and a secondary storage volume associated with the target storage volume, wherein associated target and secondary volumes together comprise an established PPRC volume pair, each source volume for storing an initial data file, executing a plurality of write commands from a host on the initial data file to generate an updated data file, and generating a record of the write commands, each target volume for receiving a snapshot copy of the initial data file and a snapshot copy of the write command record from the associated source volume, and transmitting the copy of the initial data file and data indicated by the write command record to the associated secondary volume, and each secondary volume for storing the copy of the initial data file and the data indicated by the write command record received from the associated target volume, wherein the copy of the initial data file and the data indicated by the write command record stored on the secondary volume are available for use by the secondary volume in generating a copy of the updated data file, and wherein the target volumes transmit to the associated secondary volumes in series relative to each other so that consistency is maintained at all times across the source volumes.

10. The method of claim 9 wherein the source, target, and secondary volumes each comprise a magnetic tape.

11. The method of claim 9 wherein the source, target, and secondary volumes each comprise a magnetic disk.

12. The method of claim 9 wherein the record of the plurality of write commands comprises a bitmap.

13. A method for snapshot synchronization of copies of data files from respective source storage volumes, configured in a simplex state, to established peer-to-peer remote copy (PPRC) volume pairs each associated with a respective source storage volume in order to migrate the data file copies from target storage volumes of the established PPRC volume pairs to secondary storage volumes of the established PPRC volume pairs, the method comprising:

providing a first remote copy trio; and providing a second remote copy trio, the first and second trios each comprising a source storage volume in a simplex state, a target storage volume associated with the source storage volume, and a secondary storage volume associated with the target storage volume, wherein associated target and secondary volumes together comprise an established PPRC volume pair, each source volume for storing an initial data file, executing a plurality of write commands from a host on the initial data file to generate an updated data file, and generating a record of the write commands, each target volume for receiving a snapshot copy of the initial data file and a snapshot copy of the write command record from the associated source volume, and transmitting the copy of the initial data file and data indicated by the write command record to the associated secondary volume, and each secondary volume for storing a copy of the initial data file and the data indicated by the write command record received from the associated target volume, wherein the copy of the initial data file and the data indicated by the write command record stored on the secondary volume are available for use by the secondary volume in generating a copy of the updated data file, and wherein the target volumes transmit to the associated secondary volumes in parallel relative to each other so that consistency across the source volumes is achieved when all target volumes have completed transmitting to the associated secondary volumes.

14. The method of claim 13 wherein the source, target, and secondary volumes each comprise a magnetic tape.

15. The method of claim 13 wherein the source, target, and secondary volumes each comprise a magnetic disk.

16. The method of claim 13 wherein the record of the plurality of write commands comprises a bitmap.

17. A system for snapshot synchronization of a copy of data file from a source storage volume in a simplex state to an established peer-to-peer remote copy (PPRC) volume pair in order to migrate the data file copy from a target storage volume of the established PPRC volume pair to a secondary storage volume of the established PPRC volume pair, the system comprising:

a source storage volume in a simplex state for storing an initial data file, executing a write command from a host on the initial data file to generate an updated data file, and generating a record of the write command;

a target storage volume for receiving a snapshot copy of the initial data file and a snapshot copy of the write command record from the source volume; and a secondary storage volume for storing a copy of the initial data file;

the target volume further for transmitting the copy of the initial data file to the secondary volume, and transmitting data indicated by the write command record to the secondary volume so that consistency is maintained at all times for the source volume, and the secondary volume further for receiving and storing the data indicated by the write command record, wherein the copy of the initial data file and the data indicated by write command record stored on the secondary volume are available for use by the secondary storage volume in generating a copy of the updated data file.

18. The system of claim 17 wherein the source, target, and secondary volumes each comprise a magnetic tape.

19. The system of claim wherein the source, target, and secondary volumes each comprise a magnetic disk.

20. The system of claim 17 wherein the record of the series of write commands comprises a bitmap.

21. A method for snapshot synchronization of a copy of data file from a source storage volume in a simplex state to an established peer-to-peer remote copy (PPRC) volume pair in order to migrate the data file copy from a target storage volume of the established PPRC volume pair to a secondary storage volume of the established PPRC volume pair, the method comprising:

providing a source storage volume in a simplex state for storing an initial data file, executing a write command from a host on the initial data file to generate an updated data file, and generating a record of the write command;

providing a target storage volume for receiving a snapshot copy of the initial data file and a snapshot copy of the write command record from the source volume; and providing a secondary storage volume for storing a copy of the initial data file;

the target volume further for transmitting the copy of the initial data file to the secondary volume, and transmitting data indicated by the write command record to the secondary volume so that consistency is maintained at all times for the source volume, and the secondary volume further for receiving and storing the data indicated by the write command record, wherein the copy of the initial data file and the data indicated by write command record stored on the secondary volume are available for use by the secondary storage volume in generating a copy of the updated data file.

22. The method of claim 21 wherein the source, target, and secondary volumes each comprise a magnetic tape.

23. The method of claim 21 wherein the source, target, and secondary volumes each comprise a magnetic disk.

24. The method of claim 21 wherein the record of the series of write commands comprises a bitmap.

* * * * *